United States Patent [19]

Heiermann et al.

[11] Patent Number: 5,271,297

[45] Date of Patent: Dec. 21, 1993

[54] APPARATUS AND DEVICE FOR AUTOMATICALLY INSERTING AND REMOVING SCREW-THREADED ELEMENTS INTO AND FROM TAPPED BORES

[75] Inventors: Siegfried Heiermann, Waltrop; Horst-Werner Oehler, Duisburg, both of Fed. Rep. of Germany

[73] Assignee: Westfalia Becorit Industrietechnik GmbH, Fed. Rep. of Germany

[21] Appl. No.: 991,106

[22] Filed: Dec. 16, 1992

[30] Foreign Application Priority Data

Dec. 24, 1991 [DE] Fed. Rep. of Germany ....... 4142990

[51] Int. Cl.$^5$ ............................................. B25B 29/00
[52] U.S. Cl. ........................................ 81/57.4; 81/57.38; 81/55
[58] Field of Search ............... 81/52, 54, 55, 57.38, 81/57.4

[56] References Cited

U.S. PATENT DOCUMENTS 4,120,218 10/1978 Tögel et al. .
4,380,181 4/1983 Bunyan ............................ 81/57.38
4,581,956 4/1986 Robert ............................. 81/57.38

FOREIGN PATENT DOCUMENTS 8003492 2/1980 Fed. Rep. of Germany .

Primary Examiner—James G. Smith
Attorney, Agent, or Firm—Samuels, Gauthier & Stevens

[57] ABSTRACT

Apparatus employs a device for automatically threading and unthreading studs into tapped bores of a pressure vessel containing nuclear fuel to detach or fit a cover thereto. The apparatus also employs a device with a carrier ring supporting piston and cylinder units for tensioning the studs while nuts are fitted thereon. The stud threading device is supported on a carriage displaceable along a circular track to access each stud in turn. The stud threading device has a drive member, such as a tube or rod, which is driven by a rotary drive as well as a reciprocating drive. At the lower end the drive member has a coupler which fits onto a coupler at the upper end of each stud. The couplers on the studs take the form of bayonette-type fittings with U-shaped grooves for receiving locking projections on the coupler of the drive member to establish a connection resistant to tension and relative rotation.

17 Claims, 3 Drawing Sheets

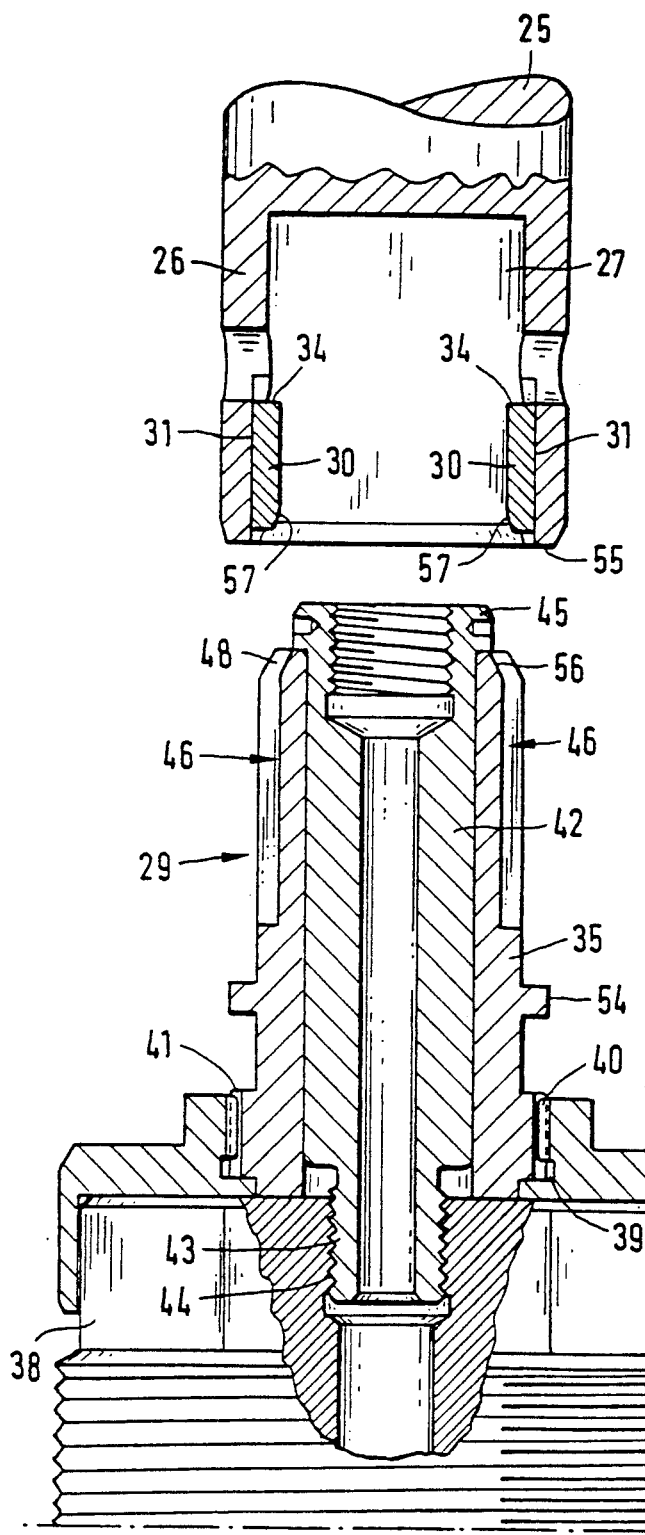
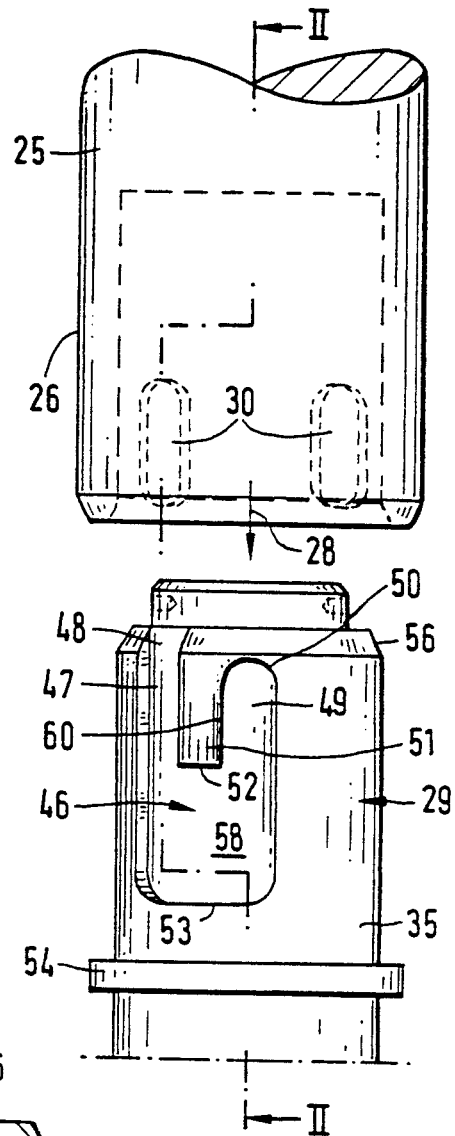

APPARATUS AND DEVICE FOR AUTOMATICALLY INSERTING AND REMOVING SCREW-THREADED ELEMENTS INTO AND FROM TAPPED BORES

FIELD OF THE INVENTION

The present invention relates to apparatus for use in automatically setting screw-threaded elements, such as bolts or studs, into tapped bores. More particularly, the invention relates to apparatus for automatically inserting screw-threaded elements into tapped bores in a pressure vessel, removing the elements from the bores and setting and unsetting nuts on the elements to fit or detach a cover on the vessel. In the case of pressure vessels containing nuclear fuel, for instance, access for personnel is restricted and hence the apparatus needs to perform its function automatically and remote from human operatives.

BACKGROUND OF THE INVENTION

In a known form of apparatus described in U.S. Pat. No. 4,120,218, a screw-setting device is provided which has a drive member which is both rotatable and movable longitudinally. The drive member can then be coupled to each screw and the screw screwed into or out from the associated tapped hole by rotating the drive member in one direction or the other.

Another screw-setting device of this type is described in DE-GM 8003492.

In both these known arrangements, the screw-turning device is arranged on a carriage which runs on a circular track on a carrier or holding ring of a screw-tensioning or clamping device so that the screws or studs arranged on a common pitch circle of the vessel may be turned in sequence and screwed into the associated threaded bores in the pressure vessel, usually in a flange thereof, or unscrewed out of the threaded bores. As the reciprocating drive for raising and lowering the drive member there may be used a reciprocating piston and cylinder simultaneously having the function of a screw-relieving cylinder which can substantially relieve each of the screws or studs in terms of weight as it is screwed into the threaded bores or unscrewed from the threaded bores, to avoid damage to the threads.

With the known screw-turning or setting devices, the drive member has both an inner tube and an outer tube. A pull- and pressure-resistant coupling with the screw-threaded stud is then produced via the outer tube while the rotatable inner tube serves for screwing the stud in and out. A head piece of the stud has a substantially triangular cross section while recesses at the gripping end of the inner and outer tube are correspondingly rectangular in shape. The device is arranged such that a rotative movement of the outer tube relative to the inner tube and the stud causes a band arranged at the lower end of the outer tube to be brought beneath a shoulder on the head piece of the stud so as to achieve locking, i.e. the pull-resistant, non-rotatable coupling with the stud. A separate locking drive, for example a handwheel drive or, in practice, a small electric motor, is used for the twisting movement required for closing or releasing the coupling.

An object of the present invention is to simplify the apparatus and particularly the screw-turning device of the type mentioned at the outset in its overall construction. A further object is to simplify the drive member, in particular, such that the use of an inner and outer tube for the pull-resistant and rotationally engaged connection to the studs is avoided.

SUMMARY OF THE INVENTION

According to the invention, this object is achieved in that the coupling means for coupling the drive member to the screw-threaded elements or studs is composed of a pair of complementary coupling members one on the drive member and another on each screw-threaded element. One of the coupling members then has projections and the other of the coupling members resembles a bayonette fixing with substantially U-shaped grooves. Each groove has one longitudinal portion open to receive an associated one of the projections and another longitudinal portion which is closed to trap the projection. The coupling member designed as a bayonette base is preferably formed by a head piece of each screw-threaded element or stud whereas the coupling member having the locking projections is preferably formed by a gripping end of the drive member element which fits over the head peace. However, the bayonette base could be arranged on the drive member and the coupling member having the locking projections on the stud or on a head piece thereof.

In a preferred embodiment, the coupling member designed as a bayonette base is a cylindrical component which has the locking grooves arranged on its diametrically opposed sides. Likewise the other coupling member is cylindrical and provided with two diametrically opposed locking projections. It is also possible to provide the bayonette base with more than two locking grooves, for example with three locking grooves, in which case there are a corresponding number of locking projections. The coupling member having the locking projections, which is preferably formed by the gripping end of the drive member, is preferably provided with a mouth which may be slipped onto the other coupling member and on whose internal wall the locking projections are located.

With the screw-turning device according to the invention, there is used for the pull-resistant and at the same time rotationally engaged coupling with the studs and for torque transmission as each stud is screwed or unscrewed, a single-part drive member which preferably consists of a rod or a tube and, at its lower end, carries the respective coupling member of the bayonette coupling or closure means corresponding to the coupling member formed by the head piece of the screw-threaded element or stud so that the coupling between the drive member and the stud may be closed and released by coordinated controlled reciprocating and twisting movements of the drive member alone. The overall construction of the screw-turning device is therefore considerably simplified. A separate locking drive is dispensed with since the rotary drive intended for screwing and unscrewing the stud is also used for closing and releasing the coupling. The drive member should be driven in both directions of rotation by the controlled rotary drive. The rotary drive in this case simultaneously has the function of a controlled angular rotational motor for closing or releasing the locking of the coupling with the coupling member of the stud as well as for imparting torque to the stud and all in cooperation with the controlled reciprocating drive. The rotary drive as well as the reciprocating drive may be controlled, even remotely controlled, by a programmed control means.

It is advisable to design said locking projections in the form of rectangular blocks or ribs on the respective coupling member such that their axial length is preferably about two to three times greater than their width. Large contact faces for torque transmission as the stud is screwed in or out are therefore available inside the locking grooves in the coupling state. The strong locking projections at the same time are reliably able to withstand the weight of the heavy stud.

Preferably there is a web separating the axial portions of each U-shaped groove and a lateral portion of the groove opposes the web and joins the axial portions together.

The axial length of the rib-like locking projections is preferably greater than the web. Comparatively small dimensions of the locking grooves as well as desirable force and torque transmission ratios can be achieved in accordance with the invention.

The head piece of the stud, which preferably forms the coupling member designed as a bayonette base, has an expedient cylindrical design over the length of the locking grooves. The mouth on the other coupling member which is preferably formed by the gripping end of the drive member may be correspondingly cylindrical in design. The locking projections are expediently designed in the manner of keys and are fixed in grooves in the respective coupling member which are worked into the cylindrical wall of this coupling member or its mouth. The rib-like locking projections advantageously have parallel lateral faces and end faces which are rounded off in the form of arcs.

The bottoms of the closed axial groove portions receiving the locking projections in the locked-in coupling state are expediently curvilinear or trough-shaped in design. To simplify the engagement of the locking projections into the grooves, the openings of the groove portions thereof are preferably designed such that they widen substantially outwardly. It is also advisable to arrange, at the free end of the coupling member designed as a bayonette base, a centring guide means e.g. a bevel which co-operates with bevels of the locking projections. Thus, when one coupling members is slipped on the other, the guide centres the members relative to one another.

The coupling member formed by the head piece on the stud may be arranged rigidly and undetachably on the stud. However, it is preferably designed as an adaptor piece connected in a pull-resistant, non-rotatable but detachable manner to the end of the stud. This also simplifies production. If the head pieces of the studs are designed as bayonette bases, the locking grooves do not need to be worked into the heavy stud. If the coupling member is arranged detachably on the stud, it is advantageous to adopt a sleeve-like adaptor piece which is placed with a multi-sided recess in a rotationally engaged manner onto a projection at the end of the stud also designed as a multi-sided component. The adapter piece can be fixed on the stud by means of an adapter screw which passes through the adapter piece and is screwed into a threaded bore in the stud. The adapter screw can have a flange or the like which is placed against the upper end of the adapter piece. The multi-sided recess may also be arranged on a separate coupling piece which is penetrated by the adapter piece. A rotationally engaged connection between the adapter piece and the coupling piece can then established by cooperating axial teeth or the like.

The reciprocating drive for the drive member of the screw-turning device expediently consists of a controlled reciprocating hydraulic drive, preferably with two parallel pressure medium operated piston and cylinders, as known. The reciprocating drive may then simultaneously assume the role of a release cylinder which, in a known manner, carries the screw-turning device together with the stud attached to it during the screwing process in order to relieve the screw threads as far as possible.

The screw-turning device according to the invention is expediently used together with a screw-tensioning or clamping device, as also known. The screw-turning device is then arranged on a carriage which runs on a circular track located on a carrier or holding ring of the screw-clamping device.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein:

FIG. 2 is a partial vertical section through the lower end of a drive member of a screw-turning device of the apparatus together with an associated head piece of a screw-threaded stud;

FIGS. 3, 4, 6 and 7 each show the lower end of the drive member and the head piece of the stud in various positions relative to one another in order to illustrate the operative movements during closure of the coupling therebetween.

To assist understanding of the invention reference may also be made to the prior art documents mentioned hereinbefore which are herein incorporated by reference.

DESCRIPTION OF PREFERRED EMBODIMENT

Figure 1:
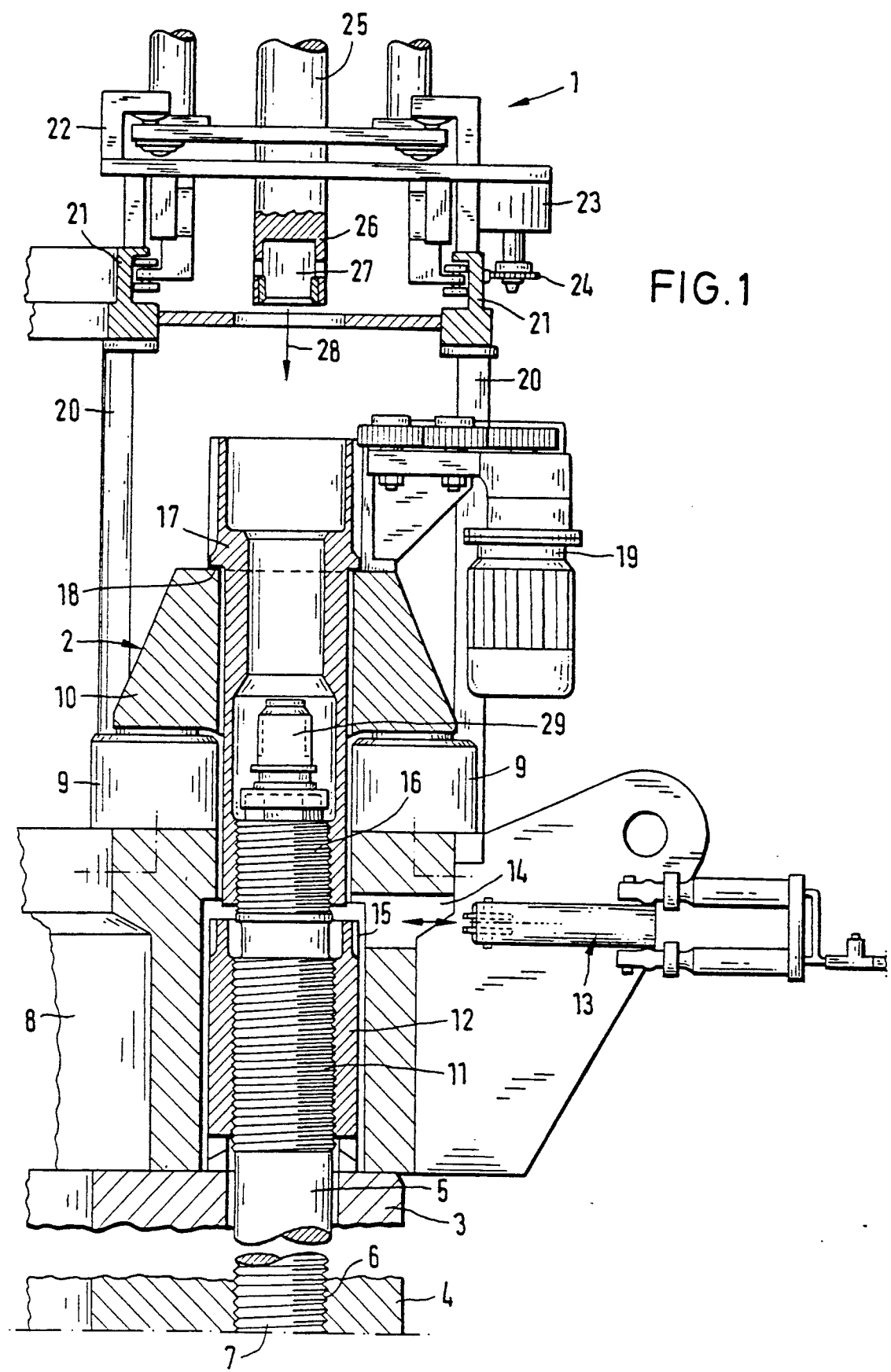
FIG. 1 is a partial vertical section through part of an apparatus constructed in accordance with the invention.

Apparatus in accordance with the invention includes a screw-turning device 1, shown merely in its lower region in FIG. 1, and a screw-clamping or tensioning device 2. The apparatus is used for opening and closing the cover lid 3 of a pressure vessel, typically a reactor pressure vessel for nuclear fuels. The cover 3 is attached and clamped to the vessel with a cover flange which engages onto a vessel flange 4 of the pressure vessel. A plurality of screw-threaded studs 5 serve to secure the cover 3 to the flange 4 of the vessel. The flange 4 of the pressure vessel has a plurality of blind bores 6 distributed over a common pitch circle. Each blind bore 6 is provided with an internal screw-thread into which the studs 5 are screwed with their lower threaded regions 7. Only one such stud 5 is shown in FIG. 1.

The clamping device 2 consists of a carrier ring 8 which may be engaged on the flange on the cover 3. For each stud 5, the carrier ring 8 supports a clamping unit in the form of two hydraulic piston and cylinder units 9 and a pressure bridge 10 which connects the units 9. By means of the clamping units, the individual studs 5 may be subjected to tension and held after being screwed into the threaded bores 6. In the embodiment as illustrated, a sleeve 17 is screwed onto an upper region 16 of the stud 5. The sleeve 17 has a shoulder 18 engaged against the upper side of the pressure bridge 10 so that the axial clamping force exerted by the hydraulic units 9 is transmitted by the sleeve 17 to the stud 5. The sleeve 17 can be rotated by means of a motor and gearing unit 19.

A nut 12 engaged on a threaded region 11 of the stud 5 can be tightened with the aid of a nut setting device 13 which may include a motor. Access for the nut setting device 13 is provided by lateral openings 14 in the ring 8. This permits the device 13 to be introduced through one of the openings to engage with teeth 15 at the upper end of the associated nut 12. The nut 12 can then be tightened by the device 13. The general mode of operation of the clamping device 2 during opening and closing of the cover 3 is known and is not described in further detail.

The carrier ring 8 is also provided with a series of vertical supports 20 which carry a double rail circular track 21. A carriage 22 is movably located on the track 21 and the screw rotating device 1 is supported by the carriage 22. The carriage 22 can travel over the full pitch circle of the studs 5 in order to screw the studs 5 in turn into or out of the threaded bores 6. The drive for the carriage 22 is designated at 23 in FIG. 1 and is composed of a driven pinion 24 engaging with a ring gear. The basic construction of the device 1 on the carriage 22 may correspond to that shown in U.S. Pat. No. 4,120,218, see FIGS. 3 and 4 or, more preferably, that shown in DE-GM-80803492, see FIGS. 1 and 2. The accompanying drawings show substantially only those parts of the screw-rotating device 1 which differs from the known devices.

In accordance with the invention, the device 1 has a drive member 25 in the form of a rod or tube with a lower hollow gripping end 26 provided with a recess or mouth 27. When the drive member 25 is lowered in the direction of arrow 28 in FIG. 1, it engages over a head piece 29 rigidly fixed to the upper end of the associated stud 5. The gripping end 26 and the head piece 29 then collectively form a coupling of the pull-resistant nonrotating type. A rotary drive, (not shown) preferably an electric motor, serves to rotate or partly rotate the drive member 25 and this drive can effect screwing or unscrewing the stud 5. The rotary drive is arranged at the upper end region of the drive member 25 and is also known per se. Preferably, the rotary drive is rotatably mounted in pivot bearings on the carriage 22. The axial reciprocal motion of the drive member 25 in the direction of arrow 28 and in an opposite direction also takes place in a known manner by means of a reciprocating drive in the form of a controlled hydraulic piston and cylinder (not shown). This reciprocating drive may consist of an individual cylinder which surrounds the drive member 25 and is mounted on the carriage as is known from U.S. Pat. No. 4,120,218. In a preferred embodiment, the reciprocating drive is composed of two reciprocating piston and cylinder units as is known from DE-GM-8003492, which are arranged on opposite sides of the drive member 25. Each unit can have a continuous piston rod with the piston rods being fixed at both their ends onto the carriage 22. The drive member 25 is then coupled to the cylinders of the unit by means of a cross-member with the drive member 25 mounted in pivot bearings of this cross-member. It is expedient if the reciprocating drive simultaneously has a known role of a relieving cylinder which carries the drive member 25 together with the rotary drive and the stud 5 suspended on the drive member 25 during the screwing process, in order to at least substantially relieve the screw threads in the threaded bore 6 and on the lower threaded region 7 of the stud 5.

The design of the drive member 25 with its gripping end 26 and the head piece 29 of the stud 5 may be appreciated from FIGS. 2 to 7. As shown in these Figures, the mouth 27 of the member 25 is formed as a cylindrical cavity at the lower gripping end 26. Diametrically opposed rib-like locking projections 30 are rigidly fixed onto the cylindrical internal wall of the mouth 27. These locking projections 30 each rest in a groove 31 in the cylindrical wall of the mouth 27. The projections 30 may be fixed, for example, by screws engaged into the grooves 31. These rib-like locking projections 30 are designed in the manner of keys which are substantially rectangular in cross-section. Their axial length is about 2 to 3 times greater than their width and they have plane parallel lateral faces 32,33 and end faces 34 which are rounded off in the form of arcs at the top and the bottom. In the illustrated embodiment, the head piece 29 is designed as an adaptor piece 35 which is connected in a pull-resistant and nonrotatable but detachable manner to the upper end of the stud 5. The adaptor piece 35 is rotationally engaged with the stud 5 by means of a substantially pot-shaped socket element 36 having a multi-sided recess 37. The multi-sided recess 37 may be hexagonal. A complementary multi-sided plug-like projection 38 at the end of the stud 5 is adapted to fit into the multi-sided recess 37 and to rotatably lock the head piece 29 to the stud 5. The socket 36 has a central bore 39 with axial teeth 40 in its base wall. The lower region of the adaptor piece 35 is provided with corresponding teeth 41 and may be introduced into the bore 39 between the opposing teeth 40. A rotationally locked connection between the adaptor piece 35 and the socket 36 is thus produced by the engagement between the axial teeth 40,41. The adaptor piece 35 is a sleeve-like component fixed onto the stud 5 and onto the socket 36 by means of an adaptor 42. This adaptor 42 has a reduced diameter screw-threaded portion 43 which is screwed into a threaded bore 44 arranged centrally on the stud 5 or in its multi-sided projection 38. At the other end, the adaptor screw 42 has a flange 45 against which the adaptor piece 35 is placed with its upper face so that the adaptor piece 35 is fixed in a tension-resistant and rotationally locked manner to the end of the stud 5.

It is possible to combine the adaptor piece 35 and the socket 36 as an integral component.

The head piece 39, i.e. the adaptor piece 35, is generally constructed in the manner of a bayonette for coupling to the drive member 25. Thus on diametrically opposed sides around its periphery, the head piece 39 has respective U-shaped locking grooves 46. One groove portion or arm 47 opens towards the free end of the head piece 39 as a gradually widening opening and the other groove arm or portion 49 is closed with a bottom wall 50 which is curved and shaped to correspond to the end face 35 of one of the locking projections 30. The groove arm portions 47 and 49 have a width which is slightly greater than the width of the locking projections 30. The spacing between the centre line of the portions 47, 49 in the peripheral direction around the cylindrical outer face of the head piece 39 is preferably about 40° to 50°, for example 45°. A web of material 51 is located between the groove arm portions 47, 49. The lateral portion 58 of the groove 46 connecting the two axial groove arm portions 47, 49 in the lower region has a dimension between the free end 52 of the web 51 and a bottom face 53 which is substantially greater than the axial length of the rib-like locking projections 30.

The head piece 29 or the adaptor piece 35 has at some distance below the U-shaped locking grooves 46 a peripheral flange 54 which acts as a stop for the free end 55 of the drive member 25. The head piece 29 or the adaptor piece 35 also has at its free upper end a centring bevel 56 which co-operates with bevels 57 of the locking projections 30.

Figure 4:
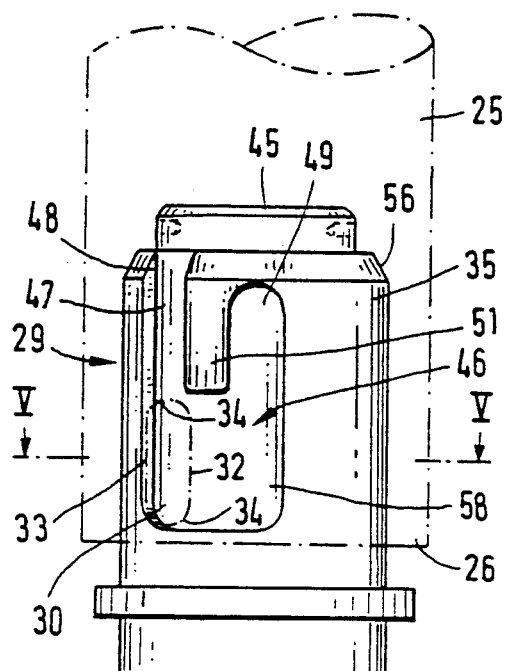

In order to unscrew the stud 5 from the threaded bore 6, the nut 12 thereon is first released by means of the nut setting device 13 once the associated piston and cylinder unit 9 have been loaded with hydraulic pressure and the stud 5 has been accordingly tensioned and clamped. Once the threaded sleeve 17 has been unscrewed by means of the rotary drive 19, the entire clamping device 2 may now be raised with the holding ring 8, whereupon the carriage 22 with the screw rotating device 1 is driven on the track 21 so that the drive member 25 is aligned above the stud 5 to be released. The drive member 25 is then lowered towards the head piece 29 of the aligned stud 5 in the direction of the arrow 28 by means of the above-mentioned reciprocating drive and is subsequently or previously rotated by means of the rotary drive into a position in which the locking projections 30 are orientated opposite the openings 48 of the grooves 46. Then, during further axial lowering of the member 25, the locking projections 30 slide down through the axial groove arm portions 47 into the lower groove portions 58 of the locking grooves 46 as shown in FIG. 4. The locking projections 30 are then located in the locking grooves 46 below the webs 51.

Figure 6:
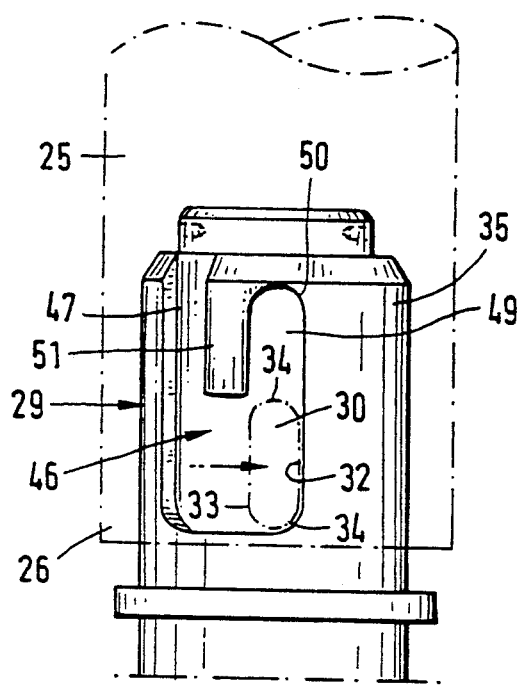
Figure 5:
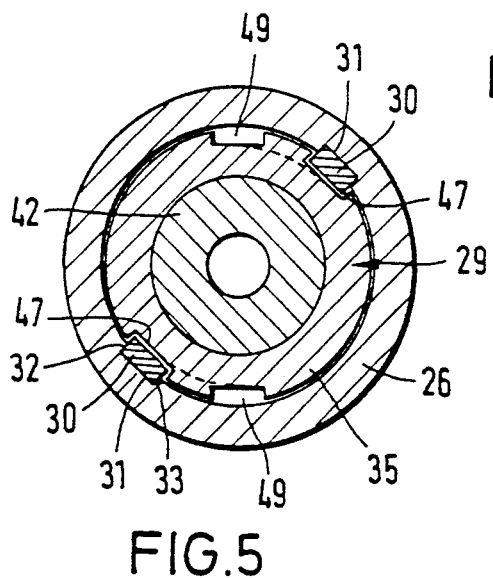
FIG. 5 is a cross-section taken along the line V—V of FIG. 4.
Figure 7:
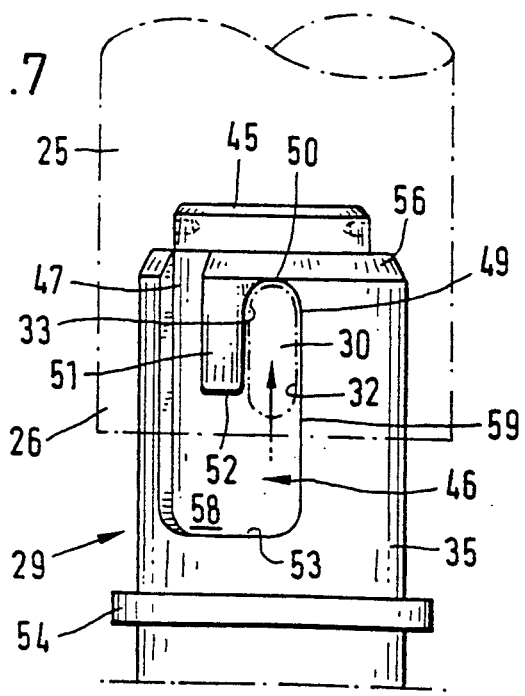

During the downward movement of the drive member 25 the bevels 56,57 guide and centre the gripping end 36 of the drive member 25 relative to the head of the head piece 29. Owing to its cylindrical form the head or adaptor piece 35 forms a sliding seat for the cylindrical mouth 27 of the gripping end 28 of the drive member 25. Relative rotation between the drive member 25 and the head piece 29 through about 45° next brings the projections 30 across the lateral portions 58 of the grooves 46 into alignment with the groove arm portions 49 with their lateral faces 32 against side faces of the groove arm portion 49 as shown in FIG. 6. As an alternative to the illustrations shown in FIGS. 4 and 6, the arrangement can be such that the gripping end 26 of the member 25 is lowered according to FIG. 4 until its lower face 55 is engaged against the stop 54. When the coupling adopts the position shown in FIG. 6 the drive member 25 can be raised to bring the projections 30 into the groove arm portions 49 as in FIG. 7. FIG. 7 clearly shows that the locking projections 30 have an axial length which is greater than the axial length of the groove arm portions 49 between the groove bottom wall 50 and the free end 52 of the web 51. In this condition the projections 30 are trapped in as shown in the axial groove arm portions 49 at the groove bottom wall 50. The result is a pull-resistant and rotationally locked coupling between the drive member 25 and the stud 5.

The drive member 25 can now be rotated by means of the above-mentioned rotary drive so as to unscrew the stud 5 from the threaded bore 6. The device is expediently arranged such that during the rotation of the member 25 so as to unscrew the stud 5 from the threaded bore 6, the locking projections 30 place themselves with their lateral faces 32 against the vertical lateral faces 59 of the arm portions 40 of the locking grooves 46 remote from web 51. This offers a relatively greater contact area and thence a greater torque to ensure the stud 5 is released.

After the stud 5 has been unscrewed from the threaded bore 6, the stud 5 suspended on the drive member 25 may be withdrawn from the bores in the cover 3 and the holding ring 8 by means of the reciprocating drive.

When it is desired to set the stud 5 into the bore 6 then the sequence mentioned above is reversed. Thus, once the drive member 25 has been coupled to the head piece 29 in the described manner as shown in FIG. 7, the drive member 25 is rotated with the rotary drive in the screwing in direction so that the locking projections 30 are engaged against the lateral faces 60 of the stop webs 51 by their other lateral faces 33 (FIG. 3). The weight of the heavy stud 5 is carried as far as possible by the reciprocating drive during the screwing-in process so that the weight cannot act adversely on the screw threads of the stud 5 and the bore 6 during the setting-in process. If the known piston and cylinder arrangement is used as the reciprocating drive for the drive member 25, in addition to the rotary drive, it is advisable not only to bring the two piston and cylinder units into action as relief cylinders during the screwing and unscrewing of the stud 5, but at the same time to provide the units with a separate rotary drive which brings about a relative rotational movement between the pistons and their cylinders during their working stroke in order to suppress the so-called slip-stick effect which is known from the above-mentioned document DE-GM-8003492.

The various operating movements of the reciprocating drive and the rotary drive for the screw-turning device 1 in order to produce the coupling between the drive member 25 and head piece 29 of the stud 5 and for releasing this coupling, may be controlled by a program in its various steps.

It will be appreciated that the head piece 29 with the locking grooves 46 need not be a separate adaptor piece 35 but instead may also be an integral part of the stud 5. In this case, the locking grooves 46 are simply worked into the end of the screw stud 5. However, it is preferable to design the head piece 29 as the releasable adaptor piece 35.

In the above-described embodiment the coupling between the stud 5 and the drive member 25 is provided as a bayonette coupling member on the stud 5 and a coupling member with projections on the drive member 25. As an alternative to the above-described embodiment, the coupling member of the coupling formed by the gripping end 26 of the drive member can form the bayonette and in this case the opposed coupling member formed by the head piece 39 then has the locking projections in the described form.

Various other modifications and changes can be effected without departing from the spirit and scope of the invention.

We claim:

1. In apparatus for use in automatically inserting and removing screw-threaded elements into tapped bores, particularly for attaching and detaching a cover of a reactor pressure vessel; said apparatus including a screw-turning device with a drive member for imparting co-ordinated rotary movements and axial movements to each one of the screw-threaded elements, a rotary drive for effecting rotation of the drive member and a reciprocatable drive for effecting axial displacement of the drive member; an improved coupling means for selectively coupling the drive member to each of the screw-threaded elements in a tension-resistant and rotationally locked manner, said coupling means comprising complementary coupling members on the drive member and each screw-threaded element, a first of the coupling members having a pair of projections and a second of the coupling members resembling a bayonette fixing with substantially U-shaped grooves corresponding to the projections, each groove having one longitudinal portion open to receive an associated one of the projections and another longitudinal portion which is closed to trap the projection.

2. Apparatus according to claim 1, wherein one of the coupling members is formed as a cylindrical head piece on the screw-threaded element and the other of the coupling members is formed as a hollow, cylindrical gripping end portion of the drive member which is adapted to fit over the head piece.

3. Apparatus according to claim 2 wherein the grooves and the projections are provided in diametrically opposed positions of the head piece and the gripping end portion of the drive member.

4. Apparatus according to claim 2 wherein the projections are disposed on an inner peripheral wall surface of one of the drive member and the head piece.

5. Apparatus according to claim 4 wherein each projection is a rectangular rib-like block fitted into a groove in the peripheral wall of the drive member.

6. Apparatus according to claim 5 wherein the axial length of each block is about two to three times greater than the width thereof.

7. Apparatus according to claim 5 wherein a web separates the axial portions of each groove and the axial length of each block is greater than that of the web of the associated groove.

8. Apparatus according to claim 5 wherein the blocks each have parallel plane side faces and curvilinear end faces.

9. Apparatus according to claim 8 wherein the other axial portion of each U-shaped groove has a curved end face.

10. Apparatus according to claim 1 wherein the one axial portion of each groove has a widened opening for receiving the associated projection.

11. Apparatus according to claim 5 wherein each block has a bevelled region and the component with the grooves has a guide and centering means for co-operating with the bevelled regions of the blocks to guide the blocks into the grooves.

12. Apparatus according to claim 1 wherein the second coupling member has a stop axially spaced from the grooves and engageable with a free end surface of the first coupling member.

13. Apparatus according to claim 5 wherein the head piece is detachably mounted to the screw-threaded element.

14. Apparatus according to claim 13 wherein the head piece is in the form of a sleeve shaped adaptor with a multi-sided recess engageable with a multi-sided projection fixed to the screw-threaded element.

15. Apparatus according to claim 14 wherein the multi-sided projection is fixed to the screw-threaded element with the aid of a component engaged in a threaded bore in the screw-threaded element and having a flange which abuts the upper end of the adaptor remote from the screw-threaded element.

16. Apparatus according to claim 15 wherein the multi-sided recess is provided on a coupling ring surrounding the adaptor and the adaptor has axially-extending teeth which engage with complementary axially-extending teeth in the coupling ring to provide a rotationally locked connection.

17. Apparatus according to claim 1 wherein the screw-turning device is supported by a carriage displaceable along a circular track on a carrier ring of a clamping device usable to set nuts on the screw-threaded elements.

* * * * *